No. 693,661. Patented Feb. 18, 1902.
J. F. LOBER.
VEHICLE TIRE.
(Application filed July 12, 1901.)
(No Model.)
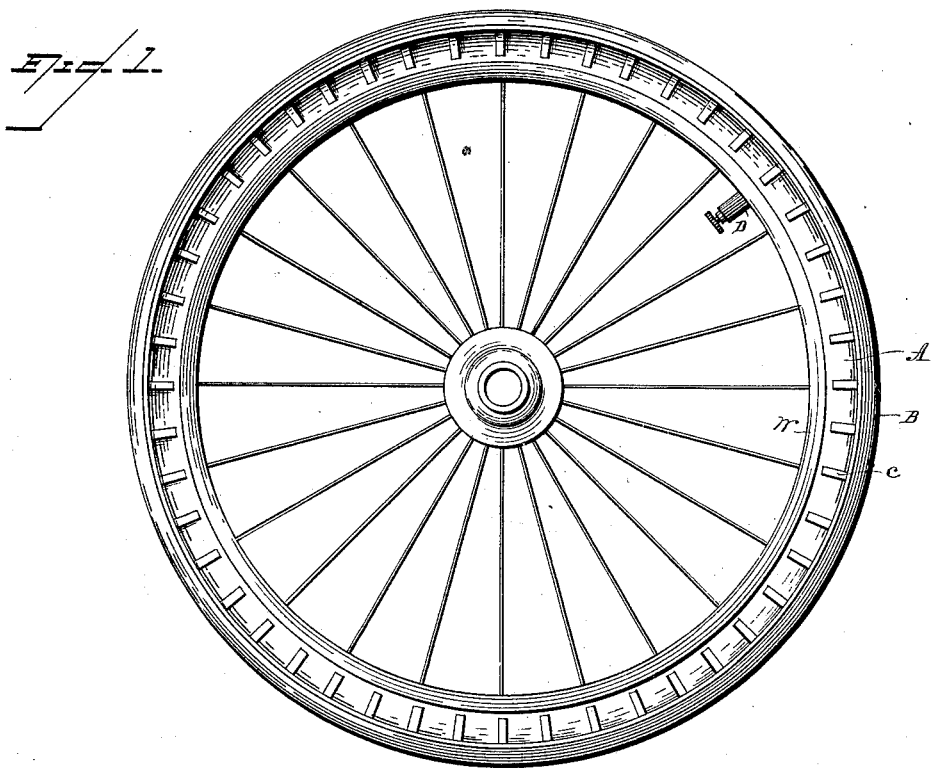
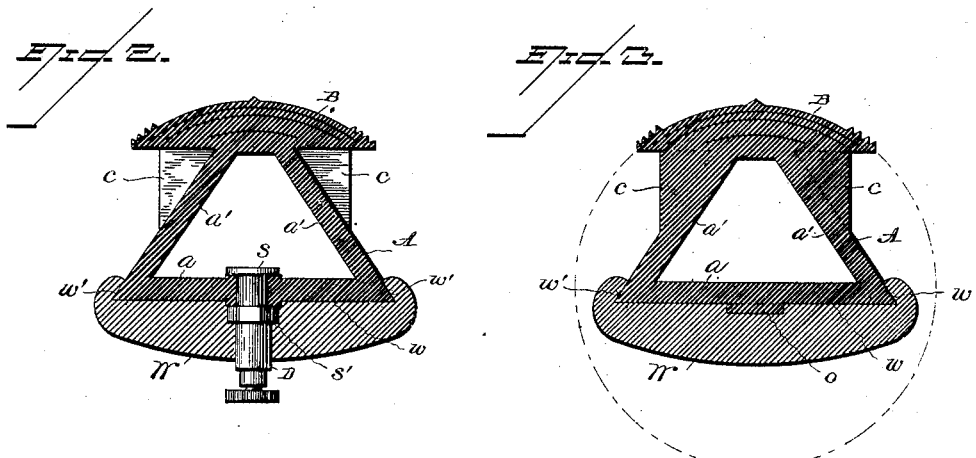
Witnesses
John F. Lober,
Inventor,
by
John Thomas & Co.,
Attorneys

UNITED STATES PATENT OFFICE.

JOHN F. LOBER, OF PITTSBURG, PENNSYLVANIA.

VEHICLE-TIRE.

SPECIFICATION forming part of Letters Patent No. 693,661, dated February 18, 1902.

Application filed July 12, 1901. Serial No. 68,074. (No model.)

*To all whom it may concern:*

Be it known that I, JOHN F. LOBER, a citizen of the United States, and a resident of Pittsburg, in the county of Allegheny and State of Pennsylvania, have invented certain new and useful Improvements in Vehicle-Tires, of which the following is a specification.

The object of this invention is to provide a pneumatic tire for vehicles which will possess certain peculiar advantages over all other tires of a similar character, presenting a tread portion which will yield to the desired extent and which will reduce to the minimum the liability to puncture, and also produce a tire of this character which is firm and durable.

My improved tire possesses the characteristic of having a body portion which is triangular in cross-section seated within a circumferential groove in the felly of the wheel and including a tread portion which is integrally connected to the apex of said triangular body and is extended laterally at either side thereof, the said parts—to wit, the body and tread of the tire—being thoroughly braced by webs formed integrally, presenting a well-constructed tire in which the hollow body portion is inflated to provide a firm structure and give the resiliency obtained in tires of this kind.

In the following specification I have entered into a detail description of my invention, reference being had to the accompanying drawings and to letters thereon which designate the different parts, and what I claim is more specifically set forth in the appended claims.

In the drawings, Figure 1 is a side elevation of a vehicle-wheel with my improved tire applied thereto. Fig. 2 is a sectional view through the tire at the point where the valve is located. Fig. 3 is a transverse sectional view.

In carrying out my invention I provide a hollow body portion A, which is triangular in cross-section, consisting of the base $a$ and converging side walls $a'$ $a'$, the latter being joined at their upper ends to a transversely-disposed tread portion B, said tread portion being extended laterally to either side of said body portion to form an increased tread-surface, which may be and preferably is rounded, as shown. The relative thicknesses of the base $a$, converging side walls $a'$, and tread B are preferably in about the proportions shown in the drawings; but I reserve the right to vary the thicknesses of the parts to the extent which practical use of the tire may suggest.

The extended sides of the tread portion are braced to the body portion of the tire by means of a series of webs $c$, which extend from one to the other and are regularly disposed around the tire to properly balance the same. These webs are located a short distance apart, and the thickness of the same corresponds to the thickness of the side walls $a'$.

The tire is provided with a valve D for inflating the same, the said valve extending through the base $a$ and tightly connected thereto, and when the tire is applied to the felly of a wheel the said valve projects through a hole in the felly in the usual manner. Any preferred form of valve may be employed, though I prefer the valve herein shown, as it may be securely connected to the tire without the use of cement, and to this end the part of the tire which surrounds the hole through which the valve extends is enlarged, as shown, so that it may be clamped between the disk $s$ and nut $s'$ of said valve, the stem of the valve being flattened at opposite sides, so that it may be held while the nut is being screwed thereon. This form of valve, in connection with the shape of the tire at the opening for the valve, forms a construction by which the valve can be readily attached and detached. Therefore should the valve get out of order it could be quickly removed and another substituted.

The tire is composed of vulcanized rubber, and in molding the same a cotton fabric is embedded in the walls $a$ and $a'$ and in the tread portion B, as is customary in tires of this kind.

To receive my improved tire, the felly W of the wheel is provided peripherally with a circumferential groove $w$, the sides of which are dovetailed, and in applying the tire it is first deflated and after being sprung upon the felly or rim is inflated. When inflated, the base portion of the tire binds in the dovetailed sides of the circumferential recess or groove and also upon the plane base surface of said groove to securely hold the tire upon the felly or rim. In order to prevent "creeping" of the tire, I purpose to provide the base $a$ with a projection $o$ on its under side to engage a corresponding depression in the felly or rim, and said projection is located opposite the valve, so that in connection with said valve the tire will be effectually held against creeping. If found necessary, other projections may be formed on the under side of the tire to increase its holding capacity against longitudinal movement or creeping, lateral movement of said tire being prevented by the raised edges of the felly or rim.

It will be particularly noted that in use the tread portion B of the tire bears centrally upon the contracted part of the body portion, and as the tire is almost continuously subjected to a direct vertical pressure the pressure will be properly distributed upon the converging side walls $a'$. It will also be noted that the hollow or inflated portion of the tire tapering to a point at the center of the tread portion reduces to a minimum the liability to puncture, and the free resiliency of the tread portion will tend to divert a penetrating point from entering the inflated body portion.

From the foregoing it will appear, therefore, that I provide a pneumatic vehicle-tire which possesses important features of advantage, that can be manufactured and sold at a reasonable price, and that can be made in sizes for application to bicycles, automobiles, and other vehicles. The tire could be applied with cement to any flat rim or felly and could therefore be substituted for any ordinary tire without changing the construction of the rim or felly.

Having thus particularly described my invention, what I claim as new, and desire to secure by Letters Patent, is—

1. A vehicle-tire comprising a hollow inflatable body portion triangular in cross-section, and a wide tread portion connected to the outer end of said triangular body, substantially as shown and described.

2. A vehicle-tire comprising a hollow inflatable body portion triangular in cross-section, a wide tread portion connected to the outer end of said body portion, and bracing-webs extending from the tread to the body portion of the tire, substantially as shown and described.

3. A vehicle-tire comprising a hollow inflatable body portion triangular in cross-section, a wide tread portion connected to the outer end of said triangular body portion, said tread portion extending laterally beyond either side of said body portion, and bracing-webs between the projecting sides of the tread to the sides of the triangular body portion, substantially as shown and described.

In witness whereof I affix my signature in the presence of two witnesses.

JOHN F. LOBER.

In presence of—
 FRANK D. BLACKISTONE,
 HORACE S. BEALL.